No. 810,914. PATENTED JAN. 30, 1906.
F. B. COOK.
PROTECTIVE APPARATUS.
APPLICATION FILED DEC. 4, 1903.

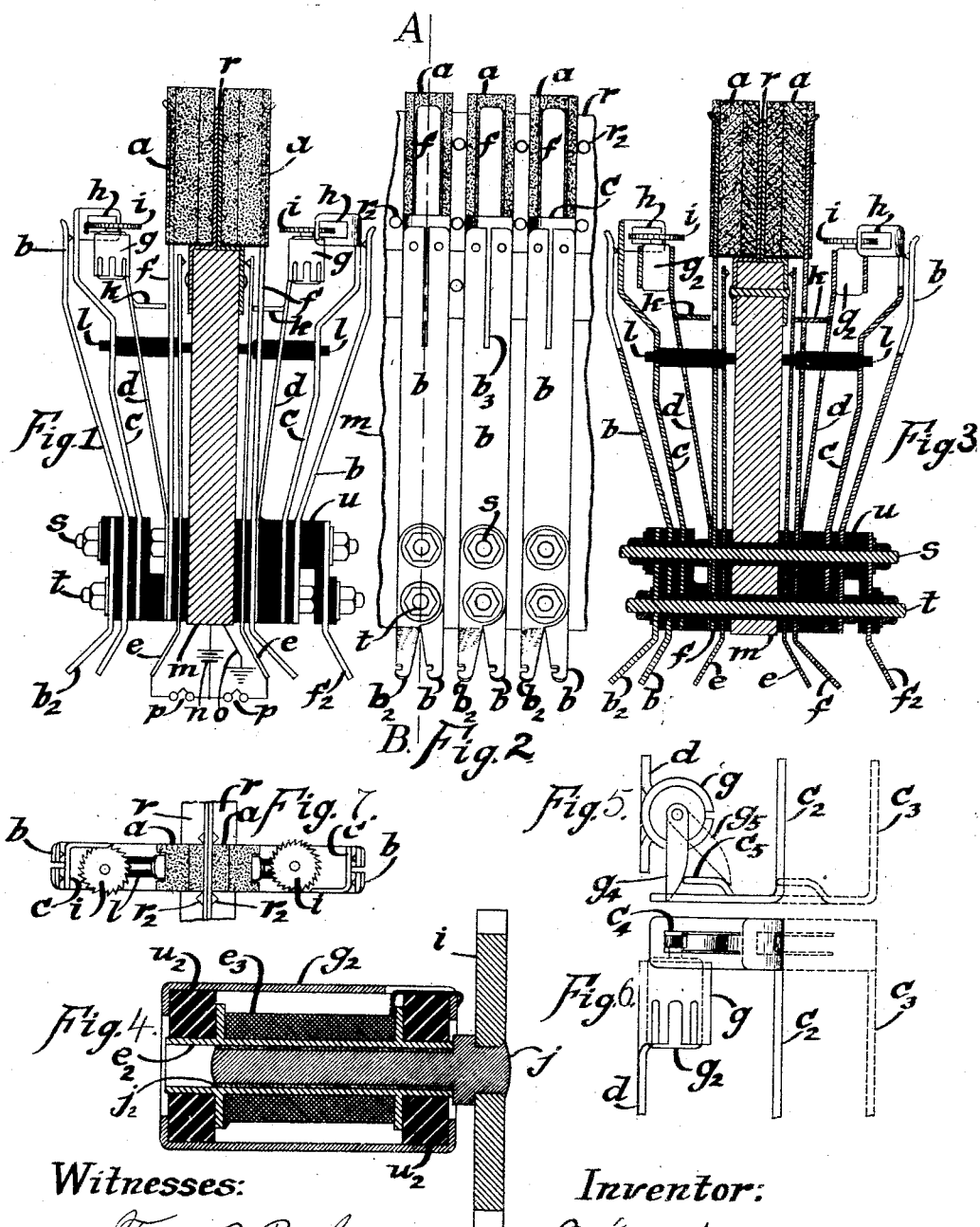

2 SHEETS—SHEET 2.

Witnesses:
Fred. R. Parker.
Harry B. Elmers

Inventor:
Frank B. Cook.

UNITED STATES PATENT OFFICE.

FRANK B. COOK, OF CHICAGO, ILLINOIS.

PROTECTIVE APPARATUS.

No. 810,914. Specification of Letters Patent. Patented Jan. 30, 1906.

Application filed December 4, 1903. Serial No. 183,733.

*To all whom it may concern:*

Be it known that I, FRANK B. COOK, a citizen of the United States, residing at Chicago, in the county of Cook and State of Illinois, have invented new and useful Improvements in Protective Apparatus, of which the following is a full, clear, concise, and exact description, reference being had to the accompanying drawings, forming a part of this specification.

My invention relates to apparatus used in connection with protective devices for electric circuits, and has for its object an arrangement of such apparatus whereby the said protective devices may be readily and efficiently utilized.

The arrangement of apparatus as shown in this invention is for supporting and operating two classes of current-protective devices—namely, protective devices which protect electric circuits and apparatus against high-tension electric discharges, such as lightning, and protective devices which protect against small "sneak-currents." The high-tension electric discharges are guarded against by means of lightning-arresters, preferably consisting of carbon blocks with interposed dielectrics, and the sneak-currents are guarded against by means of heat-coils or thermal protectors.

This invention comprises spring-supports provided with suitable contacts and arranged for holding the lightning-arresters and heat-coils, the said spring-supports being suitably mounted on a plate which is preferably a part of the iron supporting-frame and conductively connected to earth. When this apparatus is used in connection with telephone systems to provide protection therefor, the said springs form terminals for the lines, switchboard, and alarm-circuits. When a thermal protector operates, it throws a ground on certain springs of the combination, or in case of a modified form of this invention, as will be hereinafter shown, it grounds all of the springs in the combination.

Another feature of this invention is the provision of switch-sockets adapted to coöperate with a test-plug, and thereby allow the different circuits through the protective apparatus to be tested.

I will more particularly describe my invention by reference to the accompanying drawings, illustrating same, in which—

Figure 8:
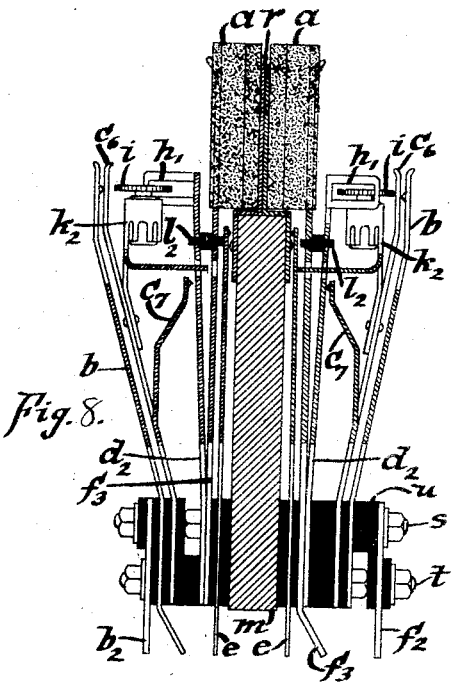
Figure 9:
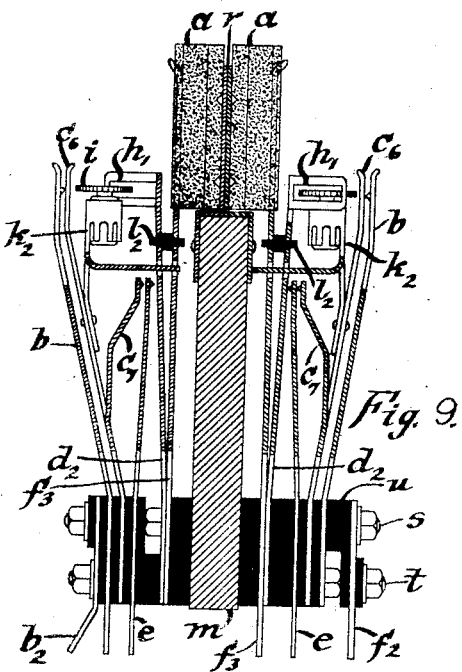
Figure 10:
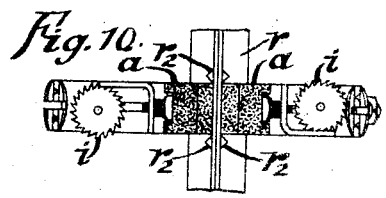
Figure 11:
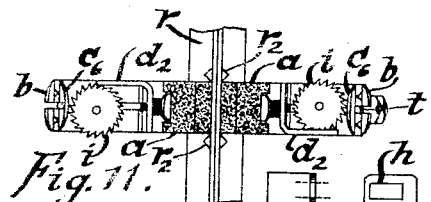
Figures 12, 13:
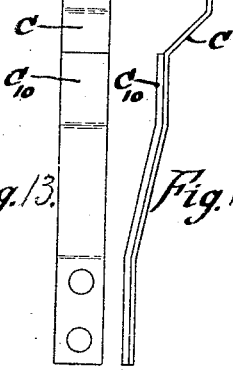

Figure 1 is a plan view of the invention. Fig. 2 is a side elevation of Fig. 1, showing three sets of the protective apparatus mounted side by side. Fig. 3 is a sectional view of the invention, taken on line A B of Fig. 2, with portions being shown in elevation. Fig. 4 is a sectional view of the heat-coil preferably used, taken on a plane including the axis of the coil. Fig. 5 is an end view of a modified form of the heat-coil and connecting-springs. Fig. 6 is a side view of the modified form of heat-coil and connecting-springs shown in Fig. 5. Fig. 7 is a top end view of Fig. 1. Fig. 8 is a sectional view of a modified form of the invention, taken the same as Fig. 3, with portions shown in elevation. Fig. 9 is a sectional view of another modified form of the invention, taken the same as Fig. 3, with portions shown in elevation. Fig. 10 is a top end view of Fig. 8. Fig. 11 is a top end view of Fig. 9, and Figs. 12 and 13 are views of a modified form of support for spring $c$ of Fig. 1.

Like characters refer to like parts in the several figures.

The metal plate $m$ is preferably a part of the iron framework supporting the strips of protective apparatus or a part of the iron framework of a distributing-board through which the telephone-lines pass on their way to a central-station switchboard, and it is preferably connected to earth. It may be a part of any apparatus on which protective devices are mounted. The protective devices and springs are mounted in pairs upon plate $m$ and are preferably arranged so that the two devices forming a pair are mounted one on either side of this plate $m$ and opposite to each other. As the two protective devices forming a pair are similar to each other, I will describe in detail only one of the pair.

The conducting-strip $r$ is secured to one edge of plate $m$ and is provided with small projections $r^2$ $r^2$ thereon, between which projections carbon lightning-arresters $a$ $a$ are placed. This ground-strip $r$ forms the subject-matter of my copending application, Serial No. 219,645, filed August 5, 1904, for ground-strips for protective apparatus, which is a division of this present application. Springs $e$, $f$, $d$, $c$, and $b$ are all mounted flatwise on one side of plate $m$ by two double-ended bolts $s$ and $t$, as shown in Figs. 1, 2, and 3. The bolts $s$ and $t$ pass through suitable holes in plate $m$, but are insulated from $m$ by suitable insulating-sleeves and washers $u$, preferably of hard rubber. Spring $e$ is mounted next to plate $m$, but insulated therefrom, and is provided with a contact at its free end adapted to make contact with the ground-strip $r$ when spring $e$ is depressed and with a hole therein through which an insulating-pin $l$ passes and rests against the plate $m$. This spring $e$ is used for closing an alarm-circuit. Spring $f$ is mounted next to spring $e$, but insulated therefrom, and is provided with a narrow portion which extends past the forward edge of plate $m$, so as to form a support for the lightning-arrester $a$. The carbon blocks of the lightning-arrester, with an interposed dielectric, are inserted between spring $f$ and ground-strip $r$ and are held in place by the tension in spring $f$ and the projections $r^2$ $r^2$ on strip $r$. Spring $f$ is also provided with a hole therein through which a contact-point passes when the heat-coil operates and with another hole therein through which the insulating-pin $l$ passes. The insulating-pin $l$ is provided with a shoulder near its inner end, against which spring $e$ rests, said shoulder being adapted to hold spring $e$ out of contact with spring $f$. Spring $d$ is mounted against spring $f$, so as to make electrical contact therewith, is formed into a thimble $g$ at its free end, adapted to receive and hold the body $g^2$ of the heat-coil, and is provided with a contact-point $k$, adapted to pass through a hole in spring $f$ and make contact with spring $e$ when the heat-coil operates, and with a hole therein through which the insulating-pin $l$ freely passes. Spring $c$ is mounted next to spring $d$, but insulated therefrom, is provided with a lip at its free end, in which is cut a hole $h$, adapted to engage a toothed wheel $i$ of the heat-coil, and with a hole therein through which the insulating-pin $l$ passes, the tension in spring $c$ being against a shoulder near the outer end of $l$, which supports the spring $c$ in a rigid position. Spring $b$ is mounted next to spring $c$, but insulated therefrom at its fixed end, and is provided with contacts at its free end, which rest against spring $c$ and make contact therewith, spring $b$ being split at $b^3$, so as to give two independent points of contact with spring $c$. Spring $b$ is adapted and intended to form a switch-socket with spring $c$, in which socket a test-plug may be inserted to break the contact between springs $b$ and $c$ and allow the different circuits through the protective apparatus to be tested, the contact-points on spring $b$ serving to prevent lateral displacement of the test-plug. The test-plug adapted to be used with this protective apparatus forms the subject-matter of my copending application, Serial No. 202,653, filed April 11, 1904, for test-plug for protective apparatus, which is a division of this present application.

The left-hand side of Figs. 1 and 3 shows the heat-coil and springs in a set position, while the right-hand side of these figures shows the heat-coil and springs in an operated position. On the right-hand side of Fig. 3 spring $b$ is insulated from bolt $s$ and conductively secured to bolt $t$ by a nut. Terminal $b^2$ is mounted on bolts $s$ and $t$, being insulated from bolt $s$ and conductively secured to bolt $t$. On the left-hand side of Fig. 3 springs $f$ and $d$ are insulated from bolt $t$ and conductively secured to bolt $s$ by a nut. Terminal $f^2$ is also mounted on bolts $s$ and $t$, being insulated from bolt $t$ and conductively secured to bolt $s$. It will be readily seen that terminal $b^2$ is conductively connected to spring $b$ on the opposite side of plate $m$ from $b^2$ through the agency of bolt $t$ and that terminal $f^2$ is conductively connected to springs $d$ and $f$ on the opposite side of plate $m$ from $f^2$ through the agency of bolt $s$. This arrangement puts the line-terminals $f^2$ and $f$ on one side of the plate $m$ and the switchboard-terminals $b$ and $b^2$ on the other side of plate $m$, as shown at the lower part of Fig. 3. The alarm-annunciators $p$ $p$ are connected to the alarm-springs $e$ $e$, respectively, and to a common source of electricity $n$. The source $n$ is also connected to the ground-plate $m$, as shown in Fig. 1

The heat-coil which I preferably use in this invention is shown in section in Fig. 4; but I desire it to be understood that other forms of heat-coils may be equally used. The heat-coil herein shown consists of a hollow heat-conducting element $e^2$; a pin $j$, secured therein by fusible material $j^2$; a toothed wheel $i$, secured to the pin $j$; a coil $e^3$, wound upon the core $e^2$; insulating-washers $u^2$ $u^2$, placed one on either end of the core $e^2$, and a conducting-casing $g^2$, supported by the washers $u^2$ $u^2$ and inclosing the coil $e^3$. The terminals of coil $e^3$ are connected to the core $e^2$ and the casing $g^2$, respectively. This heat-coil of Fig. 4 is shown, described, and claimed in my copending application, Serial No. 181,211, filed November 14, 1903, for heat-coil.

When an abnormally large current traverses the winding $e^3$ of the heat-coil for a short length of time, it heats the core $e^2$ thereof, which conducts the heat to the fusible material $j^2$. When the heat is sufficient, the fusible material $j^2$ softens, thus allowing the pin $j$ to turn within the hollow core $e^2$. When the heat-coil is placed in a set position in relation with the springs $d$ and $c$ of the protective apparatus, the body of the coil is held within the hollow end of spring $d$ and a tooth of the toothed wheel $i$ is engaged by the lip on the free end of spring $c$. This engagement of spring $c$ with the toothed wheel $i$ keeps the contact-point $k$ out of contact with spring $e$, as shown on the left-hand side of Figs. 1 and 3. When the pin $j$ is free to turn within the hollow core $e^2$, due to the fusible material $j^2$ softening, the toothed wheel $i$ turns with the pin $j$, due to the tension in spring $d$, and thereby releases itself from the spring $c$. This allows the contact-point $k$ of spring $d$ to come in contact with spring $e$ and cause the latter to make contact with the ground-plate $m$, as shown on the right-hand side of Figs. 1 and 3. It will be seen with this position of the springs that the line-spring $f$ is grounded through the agency of springs $e$ and $d$, also that the alarm-circuit is closed through the battery $n$, annunciator $p$, spring $e$, and ground-plate $m$, thus operating the annunciator $p$. When the fusible material $j^2$ cools and hardens, the pin $j$ is again soldered within the hollow core $e^2$, and the heat-coil is ready to be reset.

The lightning-arrester $a$ operates in a manner well understood. When a high-potential charge comes in over the line-spring $f$, it discharges from one carbon block to the other through the thin interposed dielectric and passes through the strip $r$ and ground-plate $m$ to earth, as at $o$ in Fig. 1.

In Figs. 5 and 6 I have shown a modified form of heat-coil and engagement-spring. Instead of the heat-coil being supplied with a toothed wheel $i$ it is supplied with a contact piece or cam $g^4$, adapted to engage spring $c$ in a slot $c^4$ in one end thereof, spring $c^2$ being provided with a tongue $c^5$, adapted to restore the heat-coil to operative position after operation. When the heat-coil operates, the contact-piece $g^4$ takes the position $g^5$ and the heat-coil takes the relative position with respect to spring $c^2$ indicated by the dotted-line view $c^3$. When the heat-coil is reset, the tongue $c^5$ engages the cam $g^4$ in the position $g^5$ and turns the latter back to its original position, where it again engages the spring $c^2$, as originally, the heat-coil at the same time turning in the thimble $g$. Any conducting member, such as a wire, may be used for $g^4$.

In Figs. 8 and 10 I have shown a modified form of the protective apparatus. The ground-plate $m$, lightning-arresters $a$ $a$, strip $r$, springs $e$ $e$ and $b$ $b$, bolts $s$ and $t$, and terminals $b^2$ and $f^2$ being the same as in Fig. 1. In this modified form spring $f^3$ takes the place of spring $f$ of Fig. 1, the hole in $f^3$, through which an insulating-pin $l^2$ passes, being closer to the lightning-arrester than in Fig. 1. Spring $d^2$ is mounted next to spring $f^3$ and conductively connected therewith. It is provided with a lip at its free end, in which is cut a hole $h'$, adapted to engage the toothed wheel $i$ of the heat-coil with a hole through which the insulating-pin $l^2$ passes and with a hole through which a contact-piece passes. The pin $l^2$ supports spring $d^2$ in a rigid position and holds spring $e$ out of contact with spring $f^3$. Spring $c^6$ is mounted between springs $d^2$ and $b$, but insulated therefrom, and is provided with a portion $c^7$, adapted to make contact with spring $d^2$ when the heat-coil operates. Spring $k^2$ is secured to spring $c^6$, is provided with a contact-piece adapted to pass through springs $d^2$ and $f^3$ and press spring $e$ against ground-plate $m$ when the heat-coil operates, and is formed into a thimble at one end for holding the heat-coil therein. When the heat-coil operates, springs $c^6$ and $b$ remain in contact with each other, and all of the springs of the group are grounded, as shown on the right-hand side of Fig. 8.

Figs. 9 and 11 show another modified form of the protective apparatus. This modified form is the same as Fig. 8, except that spring $e$ is placed between springs $d^2$ and $c^7$ instead of between spring $f^3$ and the ground-plate $m$, and the contact-piece of $k^2$, which passes through springs $d^2$ and $f^3$, makes contact with the plate $r$ direct, when the heat-coil operates, and thereby grounds all of the springs of the group, as shown on the right-hand side of Fig. 9.

Figs. 12 and 13 show a modified form of support for spring $c$. The support consists of a thick rigid piece $c^{10}$, formed to lie against spring $c$, as shown, and takes the place of the insulating-support $l$ of Fig. 1.

While I have described particular details of construction in this invention, I do not wish to limit myself to such exact details. The general arrangement of such apparatus is what I desire to hereinafter claim.

Having thus described my invention, what I claim as new, and desire to secure by Letters Patent, is—

1. In protective apparatus, the combination with a ground-plate, of a pair of superposed springs mounted flatwise thereon but insulated therefrom and from each other, one spring of the pair being rigidly supported by a suitable support, a protective device adapted to be held in a state of stress by the said springs and conductively connected from one spring to the other, a third spring outside of the said pair and mounted flatwise on the ground-plate, but insulated therefrom and from the pair of springs, at its mounting, the said third spring making contact with the outer spring of the pair at its free end, the said third spring and inner spring of the pair being switchboard and line terminals, respectively and means for grounding one spring of the pair when the protective device operates, substantially as described.

2. In protective apparatus, the combination with a ground-plate, of a pair of superposed springs mounted flatwise thereon but insulated therefrom and from each other, one spring of the pair being held stationary by a suitable support, one of the said springs being formed into a thimble at its free end, the other said spring being provided with a lip at its free end, a heat-coil adapted to be firmly held in the said thimble, a conducting member on the heat-coil, adapted to engage the said lip, the heat-coil being held in a state of stress by the said springs, a third spring outside of the said pair and mounted flatwise on the ground-plate, but insulated therefrom and from the pair of springs, at its mounting, the said third spring making contact with the outer spring of the pair at its free end, the said third spring and inner spring of the pair being switchboard and line terminals, respectively and means for grounding one spring of the pair when the heat-coil operates, substantially as described.

3. In protective apparatus, the combination with a ground-plate, of bolts extending therethrough and insulated therefrom and from each other, a pair of superposed springs mounted flatwise on the said plate by the said bolts, and insulated from the said plate, and from each other, one spring of the pair being rigidly supported by a suitable support, a protective device adapted to be held in a state of stress by the said springs and conductively connected from one spring to the other, a third spring outside of the said pair and mounted flatwise on the ground-plate by the said bolts, the said third spring being insulated from the ground-plate and from the pair of springs, at its mounting, and making contact with the outer spring of the pair at its free end, the third spring and the inner spring of the pair being switchboard and line terminals, respectively, and means for grounding one spring of the pair when the protective device operates, substantially as described.

4. In protective apparatus, the combination with a ground-plate, of a pair of superposed springs mounted flatwise thereon and insulated therefrom and from each other, one spring of the pair being rigidly supported by a suitable support, a protective device adapted to be held in a state of stress by the said springs and conductively connected from one spring to the other, a third spring outside of the said pair and mounted flatwise on the ground-plate, but insulated therefrom and from the pair of springs, at its mounting, the said third spring making contact with the outer spring of the pair at its free end, the said third spring and inner spring of the pair being switchboard and line terminals, respectively, the outer spring of the pair being dead at its mounting, and means for grounding the movable spring of the pair by the operation of the protective device, substantially as described.

5. In protective apparatus, the combination with a ground-plate, of bolts extending therethrough and insulated therefrom and from each other, a pair of superposed springs mounted flatwise on the said plate by the said bolts, and insulated from the said plate and from each other, the outer spring of the pair being insulated from the said bolts, the inner spring of the pair being conductively secured to one of the said bolts and insulated from the other, one of the said springs being rigidly supported by a suitable support, a protective device adapted to be connected between the pair of springs at their free ends, the said device being held in a state of stress by the tension in the said springs, a third spring outside of the said pair and mounted flatwise on the ground-plate by the said bolts, the said third spring being insulated from the ground-plate, from the pair of springs and from the said bolts, at its mounting, and adapted to make contact with the outer spring of the pair at its free end, the third spring and the inner spring of the pair being switchboard and line terminals, respectively, and means operated by the giving away of the protective device, whereby the inner spring of the pair is grounded, substantially as described.

6. In protective apparatus, the combination with a ground-plate, of a pair of superposed springs mounted flatwise thereon and insulated therefrom and from each other, one of the said springs being rigidly supported, the other said spring being free to move, a protective device held in a state of stress between the said springs and conductively connected from one spring of the pair to the other, a third spring outside of the said pair and mounted flatwise on the ground-plate, the said third spring being insulated from the ground-plate and from the pair of springs at its fixed end, and making contact with the outer spring of the pair at its free end, a fourth spring interposed between the pair of springs and forming a part of the movable spring of the said pair, the fourth spring being adapted to be electrically connected with the rigid spring of the pair when the protective device operates, and a projection from the movable spring of the pair, adapted to make connection with the ground-plate when the protective device operates, and thereby ground all of the springs of the combination, substantially as described.

7. In protective apparatus, the combination with a ground-plate, of a pair of superposed springs mounted flatwise thereon and insulated therefrom and from each other, one of the said springs being rigidly supported, the other said spring being free to move, a protective device held in a state of stress between the said springs and conductively connected from one spring of the pair to the other, a third spring outside of the said pair and mounted flatwise on the ground-plate but insulated from the ground-plate and from the pair of springs at its fixed end, the said third spring making contact with the outer spring of the pair at its free end, a fourth spring interposed between the pair of springs and forming a part of the movable spring of the pair, a fifth spring interposed between the ground-plate and the inner spring of the pair, mounted flatwise on the ground-plate and insulated from the latter and from the other springs of the set, the said fourth spring being adapted to be electrically connected with the rigid spring of the pair when the protective device operates, and a projection on the movable spring of the pair adapted to make electrical connection with the ground-plate when the protective device operates, and thereby ground all of the springs of the combination, substantially as described.

8. In protective apparatus, the combination with a ground-plate, of a pair of superposed springs mounted flatwise thereon but insulated therefrom and from each other, one spring of the pair being held stationary, the other spring being free to move, and one of the said springs being formed into a thimble at its free end, the other said spring being provided with a lip thereon at its free end, a heat-coil adapted to be inserted in, and firmly held by, the said thimble, the said heat-coil being provided with a hollow core and a pin secured therein by fusible material, and a conducting member secured to the said pin and adapted to engage the said lip, an abnormally large current traversing the winding of the heat-coil for a sufficient length of time, causing the fusible material thereof to soften and thus allow the said pin and conducting member secured thereto, to turn, thereby releasing the said conducting member from the said lip and grounding the movable spring of the pair, substantially as described.

9. In protective apparatus, the combination with a ground-plate, of a pair of superposed springs mounted flatwise thereon but insulated therefrom and from each other, one spring of the said pair being held stationary, the other spring being free to move, and one of the said springs being formed into a thimble at its free end, the other said spring being provided with a lip thereon at its free end, a heat-coil adapted to be inserted in, and firmly held by, the said thimble, the said heat-coil being provided with a hollow core and a pin secured therein by fusible material, a conducting member secured to the said pin and adapted to engage the said lip, an abnormally large current traversing the winding of the heat-coil for a sufficient length of time, causing the fusible material thereof to soften and thus allow the said pin and conducting member secured thereto, to turn, thereby releasing the said conducting member from the said lip and grounding the movable spring of the pair, and means adapted to engage the said conducting member and thereby turn the heat-coil within the said thimble, when the protective apparatus is reset, the said lip again engaging the said conducting member as originally, substantially as described.

10. In protective apparatus, the combination with a ground-plate, of a ground-strip secured to one edge thereof, a spring mounted flatwise on the ground-plate and insulated therefrom, a second spring between the first-mentioned spring and the ground-plate, mounted flatwise on the ground-plate and insulated therefrom and from the first-mentioned spring, a pair of superposed springs outside of the first-mentioned spring and mounted flatwise on the ground-plate but insulated therefrom and from each other, the inner spring of the said pair being conductively secured to the first-mentioned spring, one spring of the pair being held stationary, the other spring of the pair being movable, a fifth spring outside of the said pair of springs, mounted flatwise on the ground-plate and insulated from the ground-plate and from the other said springs, at its fixed end, and making contact with the outer spring of the pair at its free end, a lightning-arrester inserted between the free end of the first-mentioned spring and the ground-strip, and a protective device held in a state of stress between the said pair of springs, the giving away of the protective device, due to an abnormally large current therein, causing the movable spring of the pair to ground itself and the second-mentioned spring, substantially as described.

11. In protective apparatus, the combination with a ground-plate, of a ground-strip secured to one edge thereof, a spring mounted flatwise on the ground-plate and insulated therefrom, a second spring interposed between the first-mentioned spring and the ground-plate, mounted flatwise on the ground-plate and insulated therefrom and from the first-mentioned spring, a pair of superposed springs outside of the first-mentioned spring and mounted flatwise on the ground-plate but insulated therefrom and from each other, the inner spring of the said pair being conductively secured to the first-mentioned spring, one spring of the pair being provided with a projection thereon adapted to make contact with the other spring of the pair, and another projection thereon adapted to make contact with the second-mentioned spring, which is adapted to make contact with the ground-plate, one spring of the pair being held stationary, the other spring of the pair being movable, a fifth spring outside of the said pair of springs, mounted flatwise on the ground-plate and insulated therefrom and from the other said springs, at its fixed end, and making contact with the outer spring of the pair at its free end, the said fifth spring being split at its free end to form two points of contact, a lightning-arrester inserted between the free end of the first-mentioned spring and the ground-strip, and a protective device held in a state of stress between the said pair of springs, the giving away of the protective device, due to an abnormally large current therein, causing the movable spring of the pair to throw a ground on all of the springs of the combination, substantially as described.

12. In protective apparatus, the combination with a ground-plate, of a ground-strip secured to one edge thereof and suitably arranged to accommodate lightning-arresters, a spring mounted flatwise on the ground-plate and insulated therefrom, a pair of superposed springs outside of the first-mentioned spring and mounted flatwise on the ground-plate but insulated therefrom and from each other, the inner spring of the pair being conductively secured to the first-mentioned spring, one spring of the pair being held stationary, the other spring of the pair being movable, a projection on one spring of the pair adapted to make connection between the two springs of the pair, a projection on one spring of the pair adapted to make electrical connection with the ground-plate, a fourth spring outside of the said pair of springs, mounted flatwise on the ground-plate and insulated therefrom and from the other springs at its fixed end, and making contact with the outer spring of the pair at its free end, the said fourth spring being split at its free end to form two points of contact, a lightning-arrester inserted between the free end of the first-mentioned spring and the ground-strip, and a protective device held in a state of stress between the said pair of springs, the giving away of the protective device, due to an abnormally large current therein, causing the movable spring of the pair to ground all of the springs of the combination, substantially as described.

13. In protective apparatus, the combination with a ground-plate, of double-ended bolts extending therethrough and insulated therefrom and from each other, ground-strips secured to one edge of the ground-plate and held against each other, a pair of superposed springs on each side of the ground-plate and mounted flatwise on the ground-plate by the said bolts, the said springs being insulated from the ground-plate and from each other, one spring of each pair being held stationary, the other spring of each pair being movable, a protective device for each pair of springs and held in a state of stress thereby, a third spring for each pair, mounted flatwise on the ground-plate between the latter and the respective pairs of springs, by the said bolts, the said third springs being conductively secured to the respective inner springs of the pairs, lightning-arresters inserted between the respective third springs and the ground-strips, a fourth spring for each pair, mounted flatwise on the ground-plate by the said bolts, outside of the respective pairs of springs, the said fourth springs making contact with the respective outer springs of the pairs at their free ends, and being insulated from the said pairs at their fixed ends, and a terminal spring for each side of the ground-plate and mounted thereon by the said bolts, but insulated from the ground-plate and from each other, one of the said terminal springs and the opposite said third spring being conductively secured to one said bolt, the other said terminal spring and its opposite said fourth spring being conductively secured to the other said bolt, this "changing over" of the springs being done to put the connection-terminals for both said third springs on one side of the ground-plate, and the connection-terminals for both said fourth springs on the other side of the ground-plate, the giving away of the protective devices, due to abnormally large currents therein, causing the movable springs of the respective pairs to ground themselves and their respective third springs, substantially as described.

14. In apparatus of the class specified, the combination of a thimble, an excess-current-operable device contained within the thimble, means for engaging a portion of the said device and tending to turn same within the thimble, and means for turning the said device within the thimble, to an operative position, after operation.

15. In apparatus of the class specified, the combination of a device operable upon an excess of current and comprising a conducting member normally secured in place by heat-susceptible material, a thimble in the nature of a spring adapted to grasp the said device and firmly hold same therein, means for engaging the said conducting member and tending to turn the said device within the thimble, the said conducting member releasing its engaging means when the heat-susceptible material is softened, and means for turning the said device within the thimble to reset the apparatus.

16. In apparatus of the class specified, the combination of a spring member formed into a thimble at one end thereof, a thermal protector contained within the thimble and firmly held against rotation by the latter, a conducting member electrically connected with the protector and held in an operative position by heat-susceptible material, a second spring member adapted to engage the said conducting member and tending to turn the said device within the thimble, the said second spring member being released by the said conducting member when the protector operates, and thereby controlling a circuit, and means adapted to engage the said conducting member and thereby turn the protector within the thimble, to an operative position, when the apparatus is reset, substantially as described.

17. In protective apparatus for electric circuits, the combination with a ground-plate, of a ground-strip secured thereto, a series of lightning-arresters held against the ground-strip, a series of spring-supports adapted to hold the respective lightning-arresters in place, a second series of springs conductively connected with the respective springs of the first series, a third series of springs forming pairs with the respective springs of the second series, a series of thermal protectors held in a state of stress between the respective pairs of springs, a fourth series of springs adapted to normally engage the respective springs of one series forming the pairs, and means for grounding one spring of any pair upon the operation of its protector.

18. In apparatus of the class specified, an electric protective device, a thimble adapted to grasp the said device and normally hold same in a fixed position, means adapted to engage the device and tending to operate same, the operation of the device causing a circuit to be controlled, and means adapted to move the said device within the thimble to operative position after operation.

19. In apparatus of the class specified, a device operable upon an excess of current in the circuit, means for holding same in an operative position, means for turning a portion of the device under abnormal conditions, to control a circuit, and means for turning the device as a whole to an operative position after operation.

20. In apparatus of the class specified, a device operable upon an excess of current in the circuit, means for holding same in an operative position, means for operating the device under abnormal conditions, and means for turning the device as a whole to an operative position after operation.

21. In apparatus of the class specified, a device operable upon an excess of current in the circuit, means for holding same in an operative position, means for turning the central portion thereof under abnormal conditions, to control a circuit, and means for turning the device as a whole to an operative position after operation.

In witness whereof I hereunto subscribe my name this 2d day of December, A. D. 1903.

FRANK B. COOK.

Witnesses:
JNO. F. TOMPKINS,
FRED. R. PARKER.